(12) United States Patent
Li (10) Patent No.: US 9,226,199 B2
(45) Date of Patent: Dec. 29, 2015

(54) METHODS AND APPARATUS FOR INTERFERENCE MANAGEMENT IN WIRELESS NETWORKING

(71) Applicant: Broadcom Corporation, Irvine, CA (US)

(72) Inventor: Wei Li, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 232 days.

(21) Appl. No.: 13/862,053

(22) Filed: Apr. 12, 2013

(65) Prior Publication Data

US 2013/0272226 A1 Oct. 17, 2013

(30) Foreign Application Priority Data

Apr. 13, 2012 (GB) .................................. 1206574.4

(51) Int. Cl.
*H04W 28/26* (2009.01)
*H04L 1/00* (2006.01)

(52) U.S. Cl.
CPC ............. *H04W 28/26* (2013.01); *H04L 1/0061* (2013.01); *H04L 1/0072* (2013.01)

(58) Field of Classification Search
CPC .... H04W 28/26; H04L 1/0061; H04L 1/0072
See application file for complete search history.

(56) References Cited

U.S. PATENT DOCUMENTS

| | | | | |
|---|---|---|---|---|
| 5,774,668 A * | 6/1998 | Choquier | ................. | G06F 9/505 370/480 |
| 5,956,509 A * | 9/1999 | Kevner | ................... | G06F 13/14 709/203 |
| 6,289,390 B1 * | 9/2001 | Kavner | ................... | G06F 9/547 709/200 |
| 2006/0078001 A1 | 4/2006 | Chandra et al. | | |
| 2010/0074277 A1 * | 3/2010 | Nishibayashi | ........ | H04W 99/00 370/474 |
| 2012/0166132 A1 * | 6/2012 | Blom | ..................... | G06Q 30/02 702/127 |

FOREIGN PATENT DOCUMENTS

KR 2004-76125 A 3/2006

OTHER PUBLICATIONS

Search Report Under Section 17 dated Aug. 23, 2012 in GB Application No. GB1206574.4.
Achaleshwar Sahai et al., "Pushing the limits of Full-duplex: Design and Real-time Implementation," Technical Report TREE1104, Department of Electrical and Computer Engineering Rice University, arXiv:1107.0607v1 [cs.NI], Jul. 4, 2011, (12 pages).

* cited by examiner

*Primary Examiner* — Ajay Cattungal
(74) *Attorney, Agent, or Firm* — Foley & Lardner LLP; Christopher J. McKenna; Paul M. H. Pua (57) ABSTRACT

Systems and techniques for managing channel reservation in a full-duplex wireless network. A transmitting node sends a media access control frame to a receiving node, including an integrity check field in a header of the frame. Upon performing an integrity check and determining that the media access control frame is addressed to itself, the receiving node sends a transmission so as to reserve the channel. If the receiving node has no data to send, the transmission may be an acknowledgement field, and if the receiving node has data to send, the transmission may be a media access control frame including an integrity check field in a header of the frame.

20 Claims, 8 Drawing Sheets

METHODS AND APPARATUS FOR INTERFERENCE MANAGEMENT IN WIRELESS NETWORKING

CROSS REFERENCE TO RELATED APPLICATION

This Application claims the benefit under 35 USC 119(a) and 37 CFR 1.55 to UK Patent Application No. 1206574.4 filed on Apr. 13, 2012, the entire contents of which is hereby incorporated by reference.

TECHNICAL FIELD

The exemplary and non-limiting embodiments of this invention relate generally to wireless networking. More particularly, the invention relates to management of interference in wireless networking through sharing of information between wireless network nodes.

BACKGROUND

Wireless networking, already popular and widespread, is steadily becoming even more popular and widespread. The increasing popularity and wider use of wireless networking places increasing demands on the infrastructure and radio resources used for wireless networking. In addition, the radio resources used for wireless networking are increasingly being put to other uses, so that wireless networking needs to share radio resources with more and more applications. Any increase in efficiency in the use of wireless networking infrastructure and radio resources is therefore highly desirable.

SUMMARY

In one embodiment of the invention, an apparatus includes at least one processor and memory storing computer program code. The computer program code is configured to, with the memory and the at least one processor, cause the receiving node to perform actions comprising at least, upon receiving, at a receiving node of a wireless network, an integrity check field in a flame header of media access control frame transmitted from a transmitting node of the wireless network, performing an integrity check on a received portion of the frame and, upon determining that the frame is directed to the receiving node, performing a transmission to reserve a wireless network channel for use by the receiving node.

In another embodiment of the invention, an apparatus includes at least one processor and memory storing computer program code. The computer program code is configured to, with the memory and the at least one processor, cause the receiving node to perform actions comprising at least configuring a media access control frame of a transmitting node of a wireless network, transmitted in a full-duplex operation in the license exempt spectrum, to include an integrity check field in a header of the frame.

In another embodiment of the invention, a method includes, upon receiving, at a receiving node of a wireless network, an integrity check field in a frame header of media access control frame transmitted by a transmitting node of the wireless network, performing an integrity check on a received portion of the frame and, upon determining that the frame is directed to the receiving node, performing a transmission to reserve a wireless network channel for use by the receiving node.

In another embodiment of the invention, a method includes configuring a media access control frame of a transmitting node of a wireless network, transmitted in a full-duplex operation in the license exempt spectrum, to include an integrity check field in a header of the frame.

In another embodiment of the invention, a computer readable medium stores a program of instructions. Execution of the program of instructions by a processor configures a receiving node of a wireless network to perform actions including at least, upon receiving an integrity check field in a frame header of media access control frame from a transmitting node of the wireless network, performing an integrity check on a received portion of the frame and, upon determining that the frame is directed to the receiving node, performing a transmission to reserve a wireless network channel for use by the receiving node.

In another embodiment of the invention, a computer readable medium stores a program of instructions. Execution of the program of instructions by a processor configures a transmitting node of a wireless network to perform actions including at least configuring a media access control frame of the transmitting node, transmitted in a hill-duplex operation in the license exempt spectrum, to include an integrity check field in a header of the frame.

These and other embodiments and aspects are detailed below with particularity.

DETAILED DESCRIPTION

Embodiments of the present invention recognize that wireless networking, like many other wireless applications, involves sharing of resources between numerous devices.

In systems operating according to the IEEE 802.11 specification, nodes engage in random access operation. In the particular mechanisms defined by the 802.11 specification, a first node refrains from transmitting over a channel until a specified time, known as a back-off time, elapses after it finds the channel to be free. Once the back-off time elapses, the first node can occupy the channel, sending a packet to a second node. After the second node receives the packet, it waits for a short interframe space (SIFS) duration and then transmits an acknowledgement frame (ACK) to the first device, without contending for the channel. The ACK is assigned an elevated priority by defining the SIFS duration as shorter than a DCF interframe space (DCIF) duration.

The 802.11 specification defines a media access control (MAC) frame structure, including fields used to check the integrity of a received data packet. To check the integrity of the packet, one CRC field is inserted into each of the data frame and the acknowledgement frame.

Figure 1:
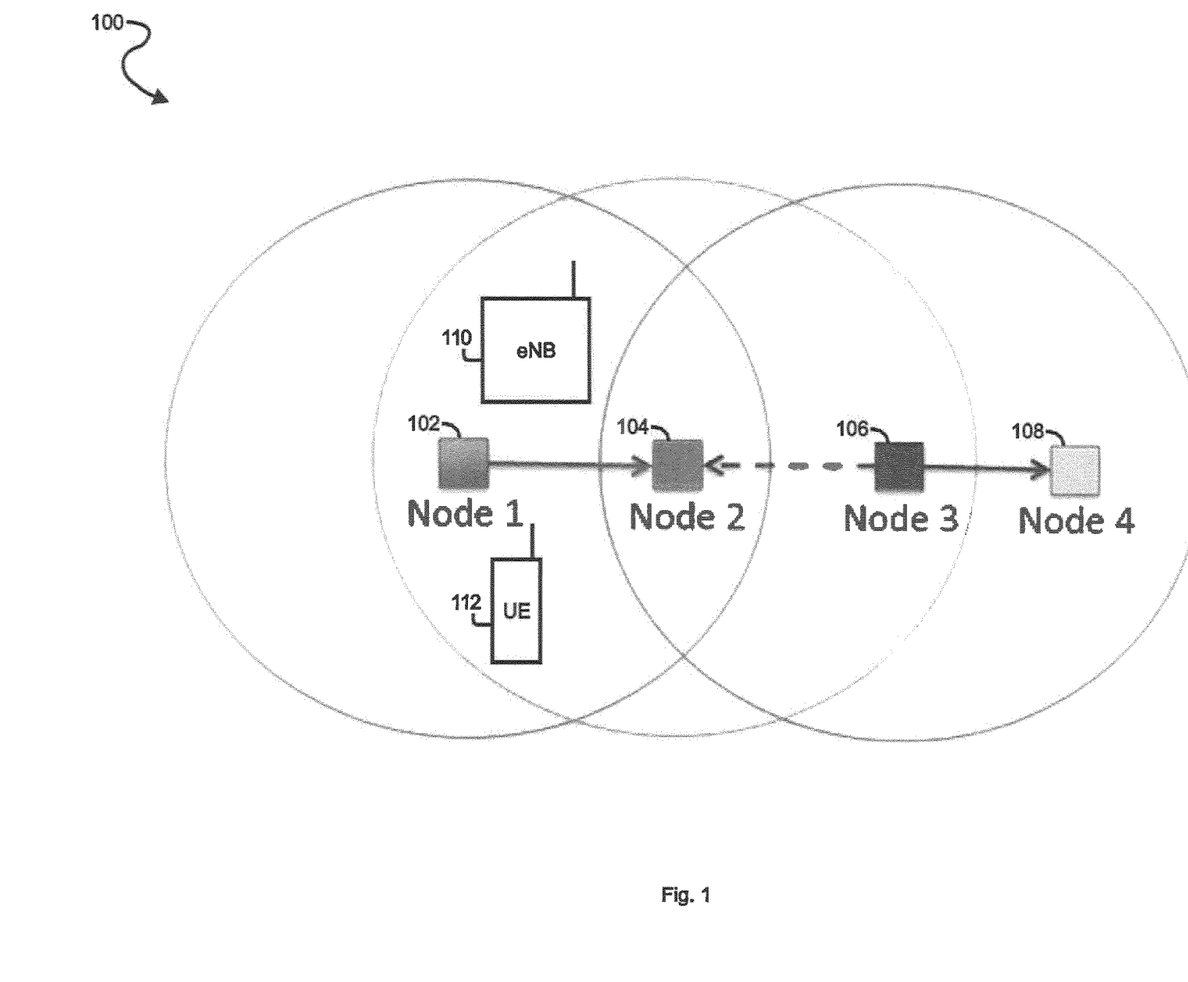
FIG. 1 illustrates a wireless network according to an embodiment of the present invention.

FIG. 1 illustrates a wireless network 100 according to an embodiment of the present invention. The network 100 includes first, second, third, and fourth nodes, which are implemented here as an access point (AP) 102, a station (STA) 104, an AP 106, and a STA 108. The AP 102 is shown here as transmitting data to the STA 104, and the AP 106 is shown as transmitting data to the STA 108. It can be seen that the AP 106 is out of range of the AP 102, but within range of the STA 104. Embodiments of the present invention provide for information sharing to prevent a sending node from interfering with a receiving node whose sending node is out of range of the receiving node. In conventional half duplex communication, a receiving node is silent while receiving from a transmitting node. It will be recognized that while the 802.11 specification describes elements that can be used with embodiments of the present invention, the invention is not limited to use in connection with the 802.11 specification, and can be used with any elements providing the required capability, such as random access and full duplex capability. In addition, other elements than the commonly understood wireless network access point (AP) may at times operate according to the 802.11 specification or may operate in other ways allowing for the use of the present invention. Therefore, the network 100 also comprises a wireless base station, which may take the form of an eNodeB (eNB) 110 having random access and full duplex capabilities. The APs 102 and 106, the STAs 104 and 108, or other devices, may at times operate as user devices, also known as user equipments or UEs, in communication with the eNB 110. For example, a user device, also known as a user equipment (UE) 112 may employ embodiments of the present invention and may be served by the eNB 110. An eNB such as the eNB 110 may, for example, be used in a network in operated in accordance with Third Generation Preferred Partnership Long Term Evolution (LTE) or Long Term Evolution-Advanced (LTE-A) standards, and eNBs and UEs so operated may be referred to as LTE or LTE-A eNBs and UEs.

The discussion below will be primarily directed to communication between APs and STAs using the 802.11 specification, but it will be recognized that the elements and procedures discussed below may be easily adapted to use with suitably equipped eNBs and UEs, for example.

In connection with 802.11, single channel full duplex (SCFD) mode is being implemented in 802.11 systems, and therefore the distinction between transmitting nodes and receiving nodes can be less rigidly observed than in the past. Each node has the ability to send data even while it is receiving data. Full duplex capability also gives a receiving node the ability to transmit signaling information while receiving data, rather than remain silent. One or more of the access points 102 and 106 and the stations 104 and 108 may all possess full duplex capability. A receiving node having full duplex capability has the ability to transmit signaling information while it is receiving a transmission. However, a receiving node typically will not respond to a transmission before it is aware that the transmission is addressed to itself, and prior-art media access control frames direct an integrity check at the end of the frame, after the frame has already been received. Therefore, a receiving node that is receiving a conventional prior-art media access control frame has no opportunity to indicate that it is receiving a transmission until the transmission is at an end. In FIG. 1, the access point 106 is within range of the station 104 but not within range of the access point 102. The access point 106 will therefore not receive any transmission informing it that the station 104 is receiving a transmission, and therefore may engage in a transmission that interferes with the station 104.

Figure 2:
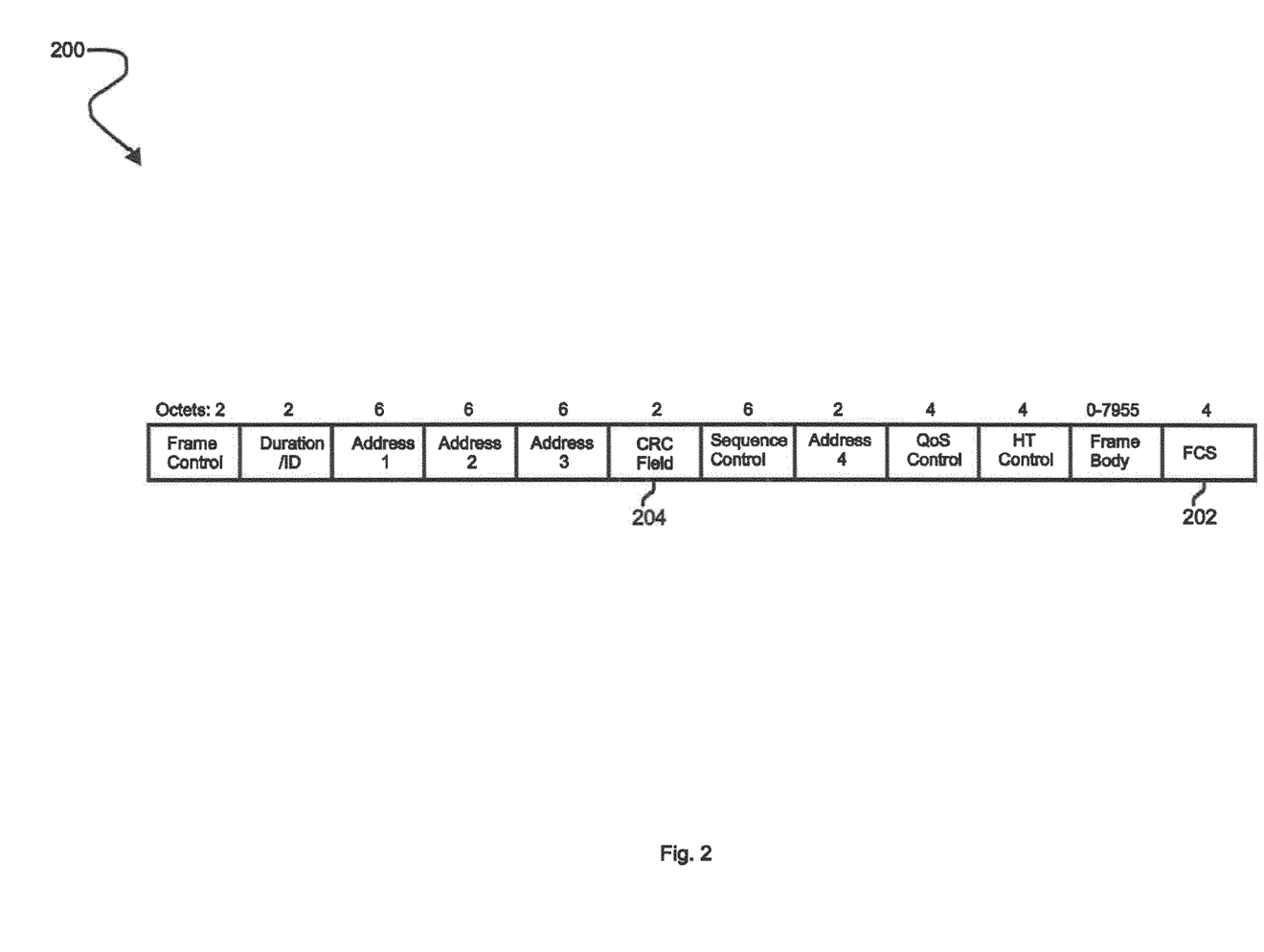
FIG. 2 illustrates timing diagrams showing wireless network transmissions according to embodiments of the present invention.

Therefore, FIG. 2 illustrates a media access control frame 200 adapted to allow for transmission by a sending and a receiving node. As in a traditional media access control frame, the frame 200 comprises a field 202. The FCS field 202 includes a CRC check 202, allowing checking of the integrity of a received packet. The frame 200 comprises a further CRC check field 204, directing the receiving node to perform an integrity check, allowing it to decode the address fields. The CRC check field 204 appears in the frame header, rather than after the frame body as in the case of the FCS field 202, so that the destination of the transmission can be identified before the entire packet has been received.

It will be recognized that the particular frame 200 is exemplary, and that other fields may be included, such as a full duplex capability indicator field. Such a field is particularly useful if some nodes have full duplex capability and others do not. In a system in which all nodes have MI duplex capability, and register such capability upon connecting to an access point, a full duplex capability indicator may not be needed. By placing an integrity check early in the frame, the frame 200 allows a receiving node to announce its presence and reserve the channel.

Figure 3:
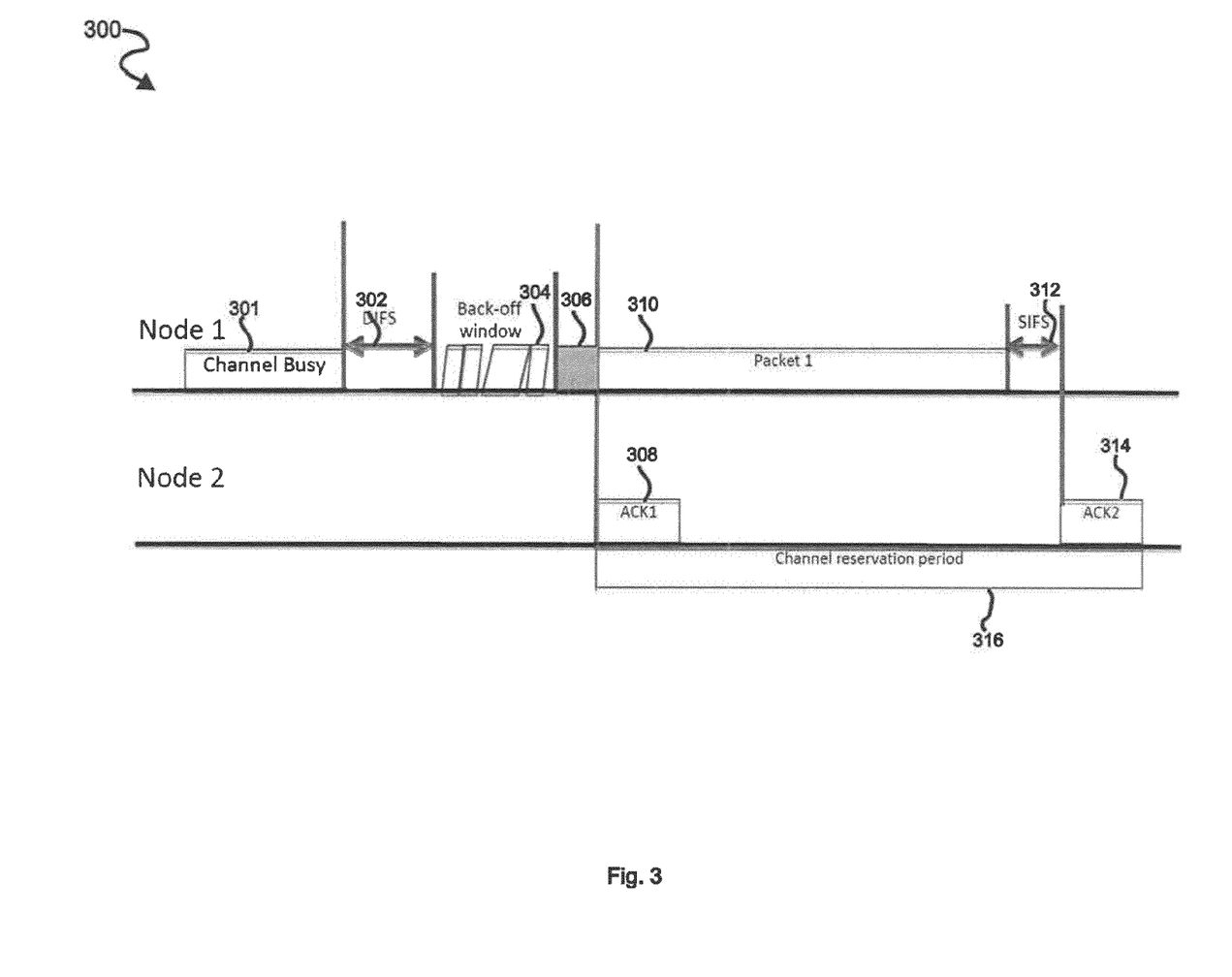
FIG. 3 illustrates timing diagrams showing wireless network transmissions according to embodiments of the present invention.

FIG. 3 illustrates a timing pattern 300 illustrating relative timing of events and signals between a first and a second node in the present exemplary case, this may be between the node 102 and the node 104. Initially, no activity occurs because a channel busy period 301 is underway. When the channel is detected to be unoccupied then a DCF interframe space (DISF) 302 begins. After the DISF 302 expires, a back-off window 304 begins. The back-off window is a specified time that must elapse after a DIFS following detection that a channel is unoccupied. After the back-off window 304 expires, the sending node transmits a CRC check field 306. The receiving node performs a CRC check and identifies the transmission as directed to itself. In the scenario presented in FIG. 3, the receiving node has no data to send and so instead it sends a special acknowledgement field 308. The field 308 can be detected by other nodes within range of the receiving node 104, and so has the effect of reserving the channel for the node 104. The receiving node can send the special acknowledgement field early in the transmission from the transmitting node, so that reservation of the channel will take place before transmission of the packet by the transmitting node.

Detection of the field 303 indicates to a detecting node that the receiving node 104 is active and therefore that the channel is occupied. The node 102 then transmits a packet 310, and, following a short inter fame space (SIFS) 312 coming after the end of the packet 308, the node 104 transmits a normal acknowledgement 314. The time between the beginning of the acknowledgement field 306 and the end of the acknowledgement frame 314 defines a channel reservation period 316.

Figure 4:
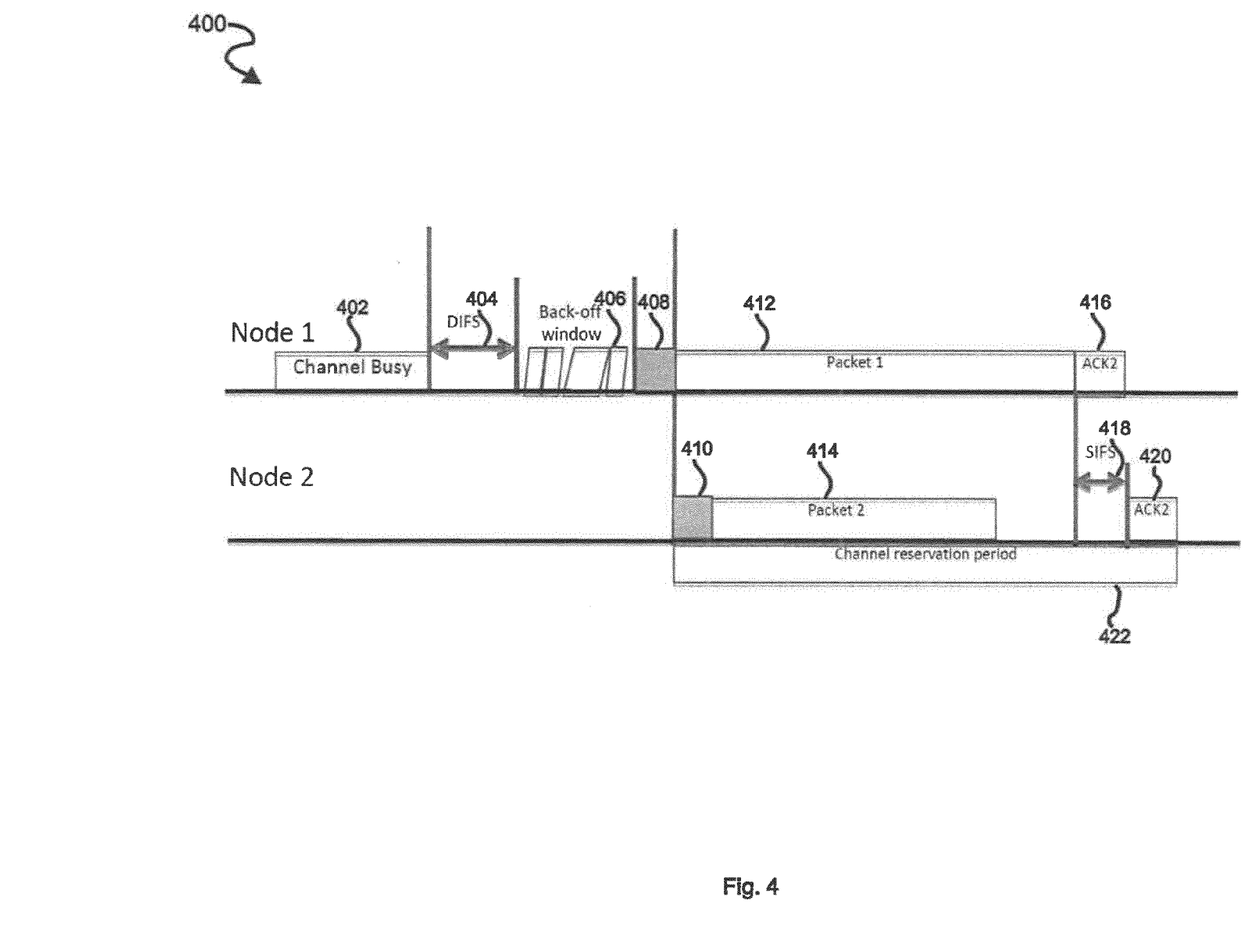
FIG. 4 illustrates timing diagrams showing wireless network transmissions according to embodiments of the present invention.

FIG. 4 illustrates a timing diagram 400, showing transmissions and timing windows of the node 102 and 104. The timing diagram 400 illustrates a channel busy period 402, a DIFS 404, and a back-off window 406. The node 102 transmits a CRC check field 408. Because the node 104 has data to transmit, it begins its own transmission procedure, transmitting its own CRC check field 410. The transmitting node 102 is directed to perform a CRC check and can therefore identify the receiving node's transmission as directed to itself. At the end of its CRC check field 408, the node 102 begins transmission of its data packet 412. At the end of its CRC check field 410, the node 104 begins transmission of its data packet 414. Both the node 102 and the node 104 are transmitting, and potential transmitters in range of each of the node 102 and the node 104 are aware that the channel is occupied.

In the present exemplary case, the packet 412 is longer than the packet 414, and so at the end of its transmission, the node 102 transmits an acknowledgement field 416. At the end of the packet 412 and the beginning of the acknowledgement field 416, the node 104 begins an SIFS period 418 and, at the end of the SIFS period, transmits its own acknowledgement field 420. The beginning of the transmission of the node 104 has the effect of reserving the channel for that node, and a channel reservation period 422 extends from the beginning of the CRC check field 410 until the end of the acknowledgement field 420.

Figure 5:
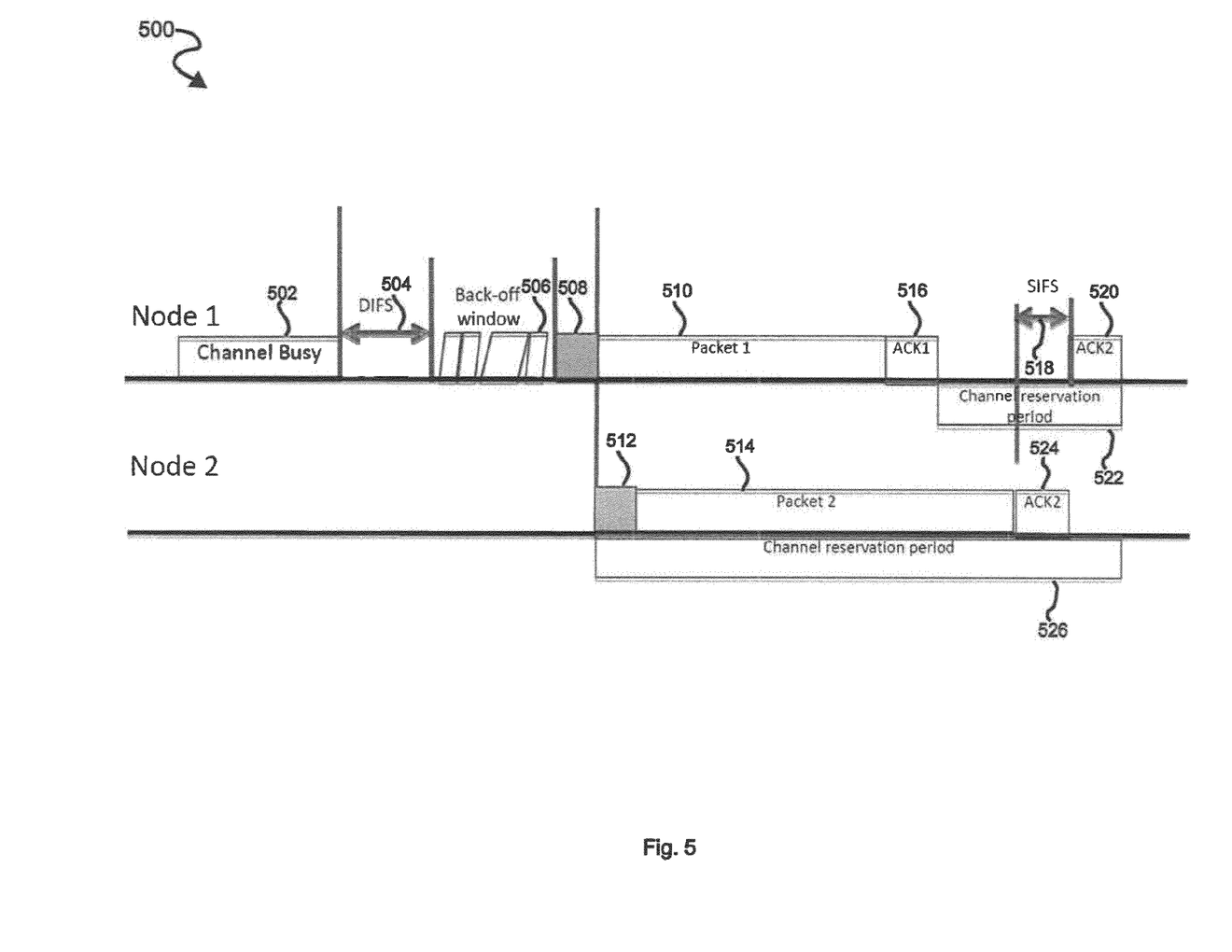
FIG. 5 illustrates timing diagrams showing wireless network transmissions according to embodiments of the present invention.

FIG. 5 illustrates a timing diagram 500, showing transmissions and timing windows of the node 102 and 104. The timing diagram 500 illustrates a channel busy period 502, a DIFS 504, and a back-off window 506. The node 102 transmits a CRC check field 508. Once the node 104 has responded to the CRC check field by performing an integrity check and identifying the transmission as directed to itself, it begins its own transmission procedure, transmitting its own CRC check field 510. At the end of its CRC check field 508, the node 102 begins transmission of its data packet 512. At the end of its CRC check field 510, the node 104 begins transmission of its data packet 514.

The packet 514 of the node 104 is longer than the packet 510 of the node 102. Therefore, at the end of the packet 510, the node 102 transmits a special acknowledgement field 516, to continue to reserve the channel while the node 104 continues to transmit. After the packet 514 finishes, the node 102 initiates an SIFS 518, and after the SIFS finishes, the node 102 transmits a normal acknowledgement field 520. A channel reservation period 522 extends from the end of the acknowledgement field 516 to the end of the acknowledgement field 520.

At the end of the packet 514, the node 104 transmits its own normal acknowledgement field 524. A channel reservation period is defined for the node 104 extending from the beginning of the CRC field 512 to the end of the channel reservation period 522 of the node 102.

Figure 6:
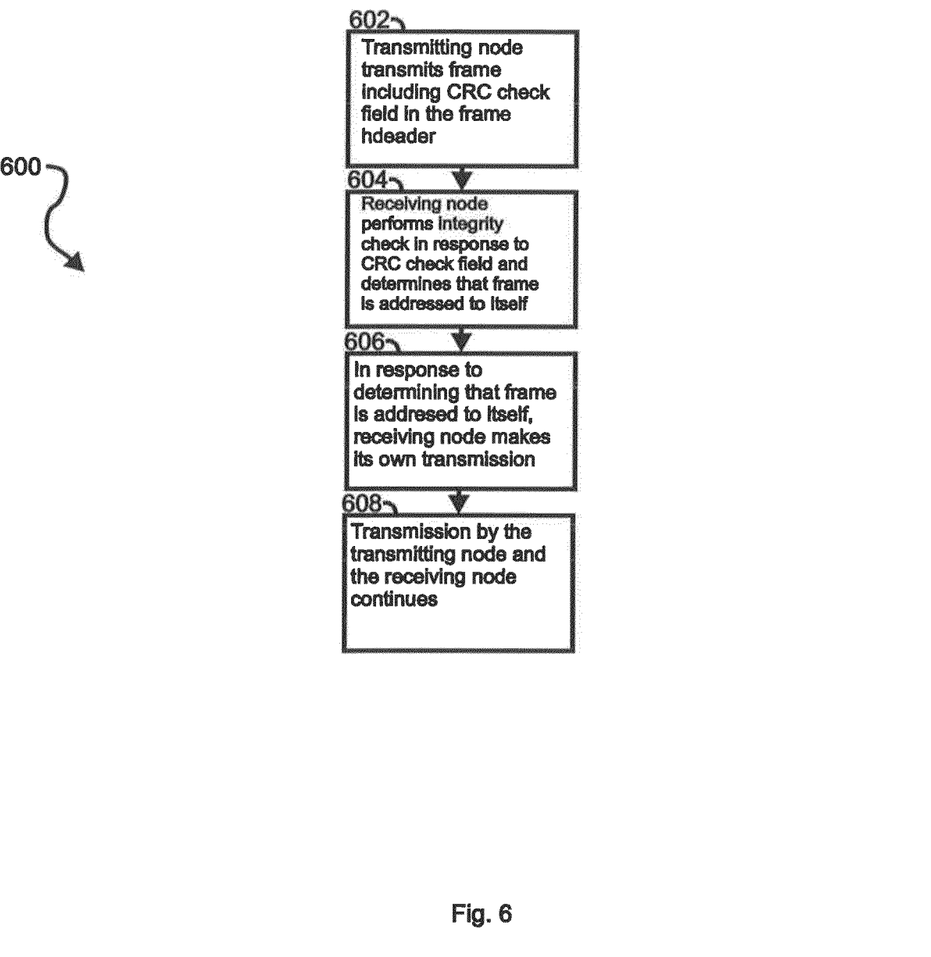
FIG. 6 illustrates a process according to an embodiment of the present invention.

FIG. 6 illustrates a process 600 according to an embodiment of the present invention. At step 602, after criteria for transmission are met, a transmitting node transmits frame including a CRC check field in the frame header. Criteria for transmission may comprise, for example, expiration of a back-off time, with the back-off time beginning after expiration of a specified time after detecting that a channel to be used for transmission is unoccupied.

At step 604 a receiving node performs an integrity check in response to the CRC check field, and determines that the frame is addressed to itself.

At step 606, in response to determining that the frame is addressed to itself, the receiving node makes its own transmission. If the receiving node has no data to send, the initial transmission may be, for example, an acknowledgement field or other special field indicating activity by the receiving node. If the receiving node has data to send, the transmission may be a media access control frame including a CRC check field in the header.

At step 608, transmission by the transmitting node and the receiving node continues. If the receiving node has no data of its own, or if its packet is shorter than the packet of the transmitting node, the receiving node transmits an acknowledgement field a specified time after the end of transmission by the transmitting node. If the receiving node is transmitting a packet that is longer than that of the transmitting node, the transmitting node transmits its own special acknowledgement signal after the end of its own data transmission in order to continue reserving the channel. The receiving node transmits an acknowledgement signal after completing its own data transmission, and the transmitting node transmits a normal acknowledgement signal after a specified time, such as a short interframe space, after the end of transmission of the packet by the receiving node.

The processes of FIG. 6 may be considered to illustrate the operation of one or more methods, and a result of execution of a computer program stored in a computer readable memory, and a specific manner in which components of an electronic device are configured to cause that electronic device to operate.

The process steps shown in FIG. 6 may also be considered as blocks of a logic flow including a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Such circuit/circuitry embodiments include any of the following: (a) hardware-only circuit implementations (such as implementations in only analog and/or digital circuitry) and (b) combinations of circuits and software (and/or firmware), such as: (i) a combination of processor(s) (ii) portions of processor(s)/software (including digital signal processor(s)), software, and memory(ies) that work together to cause an apparatus, such as an access point, station, mobile phone/UE, or other suitably configured apparatus, to perform the various functions summarized at FIG. 6 and (c) circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" also covers, for example, a baseband integrated circuit or applications processor integrated circuit for a mobile phone/UE, wireless network access point, wireless network station, or a similar integrated circuit in a server, a cellular network device, or other network device.

Figure 7:
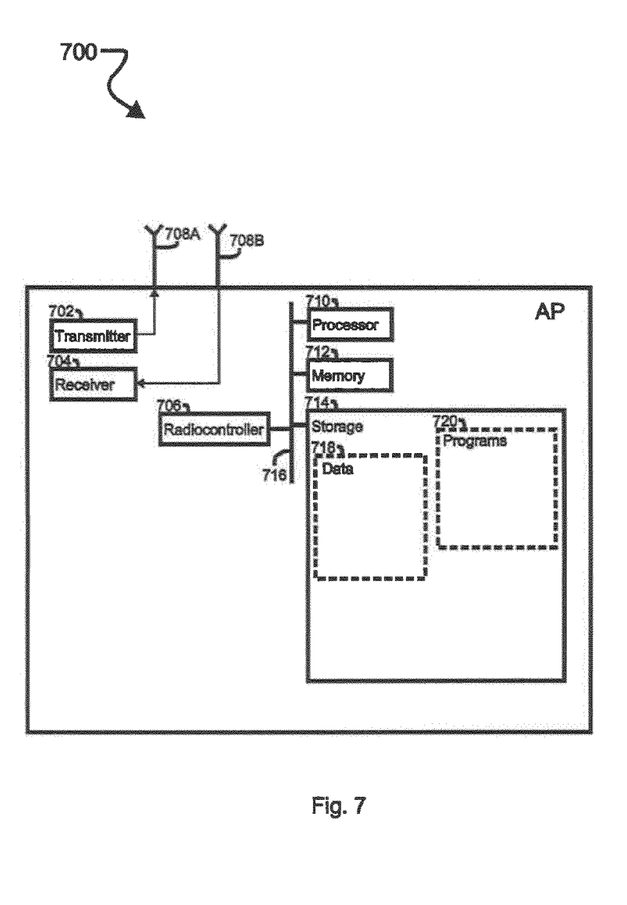
FIG. 7 illustrates network elements according to an embodiment of the present invention.
Figure 8:
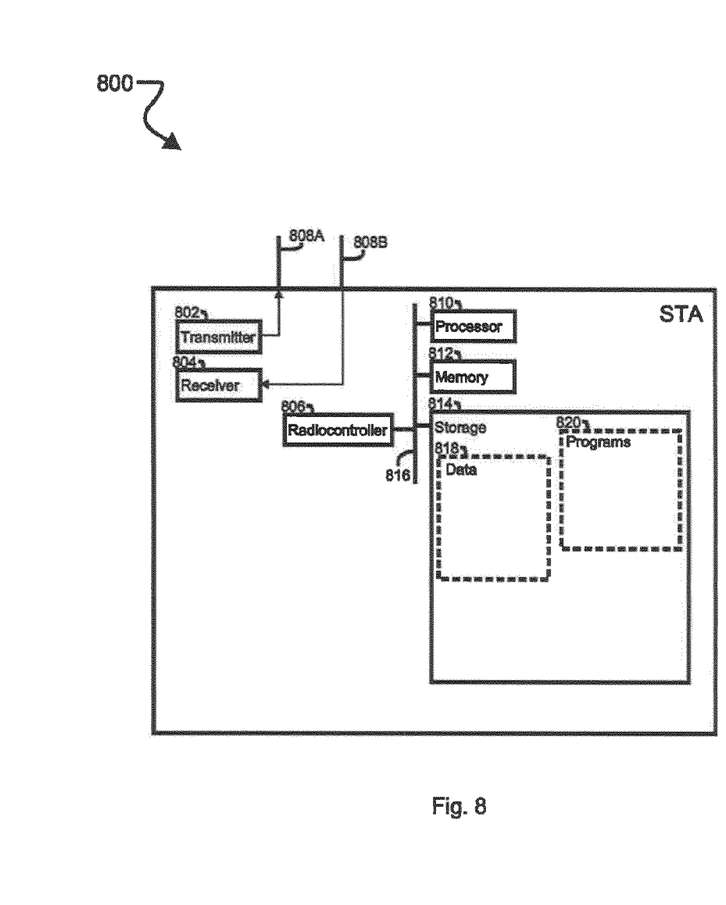
FIG. 8 illustrates network elements according to an embodiment of the present invention.

FIGS. 7 and 8 illustrate an access point (AP) 700 and a station (STA) 800, respectively, according to embodiments of the present invention. The AP 700 may comprise a transmitter 702, receiver 704, radiocontroller 706, and antennas 708A and 708B. The AP 700 may further comprise a processor 710, memory 712, and storage 714, communicating with one another and with the radiocontroller over a bus 716. The AP 700 may further comprise data 718 and programs 720, suitably residing in storage 714 and transferred to memory 712 as needed for use by the processor 710.

The STA 800 may include a transmitter 802, receiver 804, radiocontroller 806, and antennas 808A and 808B. The STA 800 may further comprise a processor 810, memory 812, and storage 814, communicating with one another and with the radiocontroller over a bus 816. The AP 800 may further comprise data 818 and programs 820, suitably residing in storage 814 and transferred to memory 812 as needed for use by the processor 810.

Figure 9:
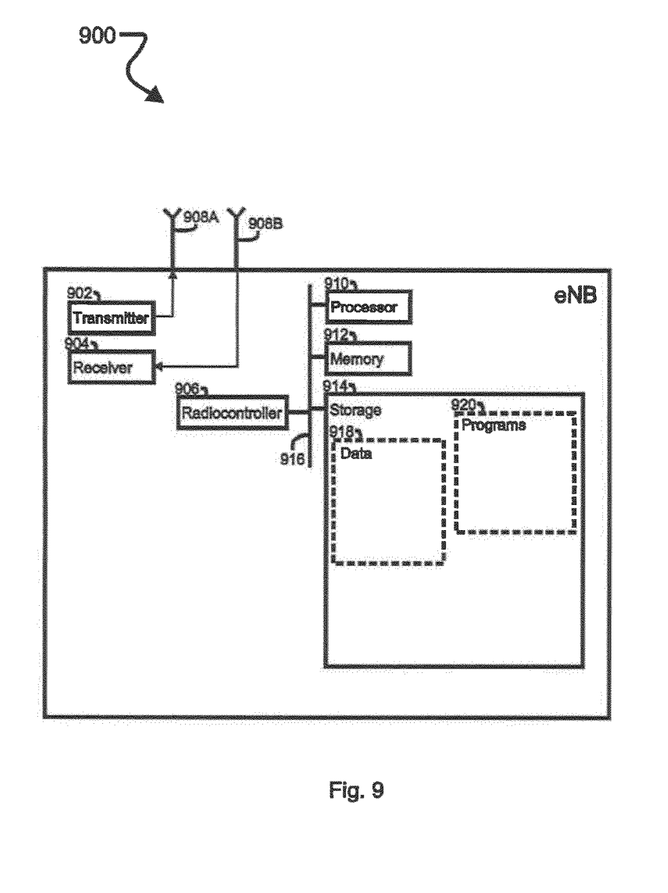
FIG. 9 illustrates an eNB according to an embodiment of the present invention.
Figure 10:
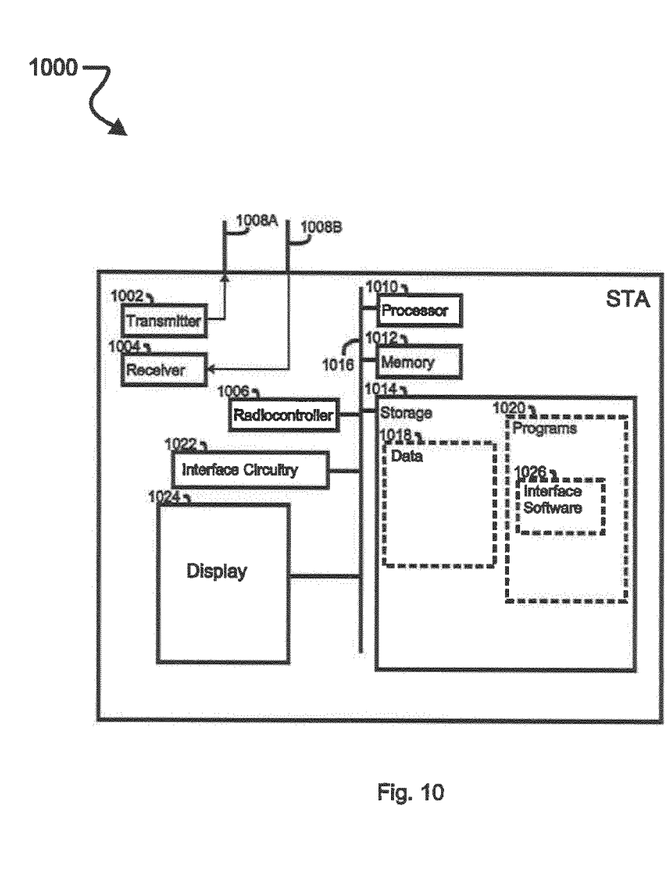
FIG. 10 illustrates a UE according to embodiments of the present invention.

FIGS. 9 and 10 illustrate an eNB 900 and a UE 1000, respectively, according to embodiments of the present invention. The eNB 900 may include a transmitter 902, receiver 904, radiocontroller 906, and antennas 908A and 908B. The eNB 900 may further include a processor 910, memory 912, and storage 914, communicating with one another and with the radiocontroller over a bus 916. The eNB 900 may further include data 918 and programs 920, suitably residing in storage 914 and transferred to memory 912 as needed for use by the processor 910.

The UE 1000 may include a transmitter 1002, receiver 1004, radiocontroller 1006, and antennas 1008A and 1008B. The UE 1000 may further comprise a processor 1010, memory 1012, and storage 1014, communicating with one another and with the radiocontroller over a bus 1016. The UE 1000 may further include data 1018 and programs 1020, suitably residing in storage 1014 and transferred to memory 1012 as needed for use by the processor 1010. The UE 1000 may also include user interface circuitry 1022 and a display 1024, as well as user interface software 1026 to facilitate at least some of the functions of the user equipment through use of the display 1024.

At least one of the programs 720 in storage of the access point 714 includes a set of program instructions that, when executed by the processor 710, enable the device to operate in accordance with the exemplary embodiments of this invention, as detailed above. The station 800 also has software 820 stored in its storage 814 to implement aspects of these teachings as detailed above. The eNB 900 has software stored in its storage 914 and the UE 1000 has software 1020 stored in its storage 1014, to implement aspects of these teachings. In these regards the exemplary embodiments of this invention may be implemented at least in part by computer software stored in storage 714 or memory 712 which is executable by the processor 710 of the UE 700, or by computer software stored in storage 814 or memory 812 executable by the processor 810 of the STA 800, or by computer software stored in storage 914 or memory 912 executable by the processor 910 of the eNB 900, or by computer software stored in storage 1014 or memory 1012 executable by the processor 1010 of the UE 1000, or by hardware, or by a combination of tangibly stored software and hardware (and tangibly stored firmware). Electronic devices implementing these aspects of the invention need not be the entire devices as depicted at FIGS. 7-10, or may be one or more components of same such as the above described tangibly stored software, hardware, firmware and DP, or a system on a chip SOC or an application specific integrated circuit ASIC.

In general, the various embodiments of the station 810 and the UE 1010 can include, but are not limited to personal portable digital devices having wireless communication capabilities, including but not limited to cellular telephones, navigation devices, laptop/palmtop/tablet computers, digital cameras and music devices, and Internet appliances, as well as the machine-to-machine type devices mentioned above.

Various embodiments of the computer readable memories 712, 812, 912, and 1012, and storage 714, 814, 914, and 1014, include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processors 710, 810, 910, and 1010 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features. The foregoing, description should therefore be considered as merely illustrative of the principles, teachings and exemplary embodiments of this invention, and not in limitation thereof.

I claim:

1. An apparatus comprising:
   at least one processor;
   memory storing computer program code;
   wherein the computer program code is configured to, with the memory and the at least one processor, cause a receiving node of a wireless network to perform actions comprising at least:
   upon receiving an integrity check field in a frame header of a media access control frame transmitted by a transmitting node of the wireless network, performing an integrity check on a received portion of the frame; and
   upon determining that the frame is directed to the receiving node and prior to receiving a complete transmission of the media access control frame, performing an initial transmission to reserve a wireless network channel for use by the receiving node.

2. The apparatus of claim 1, wherein the initial transmission comprises a special acknowledgement field transmitted if the receiving node has no data to send.

3. The apparatus of claim 1, wherein the initial transmission comprises a media access control frame comprising a cyclic redundancy check field in a frame header if the receiving node has data to send.

4. The apparatus of claim 3, wherein the cyclic redundancy check field is followed by a transmitted data packet from the transmitting node that is shorter than a received data packet from the receiving node, and wherein the received data packet is followed by a normal acknowledgement field beginning after the end of the received data packet.

5. The apparatus of claim 3, wherein the cyclic redundancy check field is followed by a transmitted data packet from the transmitting node that is longer than a received data packet from the receiving node, and wherein the transmitted data packet is followed by a normal acknowledgement field beginning after the end of the transmitted data packet.

6. The apparatus of claim 1, wherein the apparatus is a user equipment.

7. The apparatus of claim 1, wherein the transmitting node is a base station.

8. The apparatus of claim 6, wherein where the apparatus comprises:
   user interface circuitry; and wherein the computer program code is configured to, with the memory and the least one processor, facilitate user control of at least one function of the user equipment through use of a display.

9. An apparatus comprising:

at least one processor;

memory storing computer program code;

wherein the computer program code is configured to, with the memory and the at least one processor, cause a transmitting node of a wireless network to perform actions comprising at least:

initiating a transmission of a media access control frame of the transmitting node, in a full-duplex operation in a license exempt spectrum, the media access control frame including an integrity check field in a header of the frame; and detecting, prior to completion of the transmission of the media access control frame, a transmission initiated by a receiving node after an integrity check using the integrity check field.

10. The apparatus of claim 9 wherein the integrity check field comprises a cyclic redundancy check field preceding a transmitted data packet from the transmitting node.

11. The apparatus of claim 10, wherein, if the transmitted data packet is longer than a received data packet transmitted by the receiving node, the transmitted data packet is followed by a normal acknowledgement field.

12. The apparatus of claim 10, wherein, if the transmitted data packet is shorter than a received data packet transmitted by the receiving node, the transmitted data packet is followed by a special acknowledgement field to reserve a wireless network channel for use by the transmitting node.

13. The apparatus of claim 9, wherein the transmitting node is a base station.

14. A method comprising:

upon receiving, at a receiving node of a wireless network, an integrity check field in a frame header of media access control frame transmitted by a transmitting node of the wireless network, performing an integrity check on a received portion of the frame; and upon determining that the frame is directed to the receiving node and prior to receiving a complete transmission of the media access control frame, performing an initial transmission to reserve a wireless network channel for use by the receiving node.

15. The method of claim 14, wherein the initial transmission comprises a special acknowledgement field transmitted if the receiving node has no data to send.

16. The method of claim 14, wherein the initial transmission comprises a cyclic redundancy check field of a media access control frame transmitted if the receiving node has data to send.

17. The method of claim 16, wherein the cyclic redundancy check field is followed by a transmitted data packet from the transmitting node that is shorter than a received data packet from the receiving node, and wherein the received data packet is followed by a normal acknowledgement field beginning after the end of the received data packet.

18. The method of claim 16, wherein the cyclic redundancy check field is followed by a transmitted data packet from the transmitting node that is longer than a received data packet from the receiving node, and wherein the transmitted data packet is followed by a normal acknowledgement field beginning after the end of the transmitted data packet.

19. The method of claim 18, wherein the apparatus is a user equipment.

20. A method comprising:

initiating a transmission of a media access control frame of a transmitting node of a wireless network, in a full-duplex operation in a license exempt spectrum, the media access control frame including an integrity check field in a header of the frame; and detecting, prior to completion of the transmission of the media access control frame, a transmission initiated by a receiving node after an integrity check using the integrity check field.

\* \* \* \* \*